（12） United States Patent
Kirchmann

(10) Patent No.: US 8,479,837 B2
(45) Date of Patent: Jul. 9, 2013

(54) WEED STOMPING TOOL

(76) Inventor: Christopher James Kirchmann, Thunder Bay (CA)

( * ) Notice: Subject to any disclaimer, the term of this patent is extended or adjusted under 35 U.S.C. 154(b) by 174 days.

(21) Appl. No.: 12/913,435

(22) Filed: Oct. 27, 2010

(65) Prior Publication Data

US 2012/0103640 A1 May 3, 2012

(51) Int. Cl.
*A01B 1/00* (2006.01)

(52) U.S. Cl.
USPC ............................................ 172/378; 172/21

(58) Field of Classification Search
USPC ............... 172/371, 21, 22, 378, 25; 294/50.6, 294/61; D8/6, 7, 8; 408/225, 201, 203.5, 408/204; 175/385, 406, 420, 327
See application file for complete search history.

(56) References Cited

U.S. PATENT DOCUMENTS

| | | | | |
|---|---|---|---|---|
| 1,036,673 A * | 8/1912 | Meguire | ........................ | 175/420 |
| 1,881,535 A * | 10/1932 | Hargrave | ........................ | 175/420 |
| 1,960,819 A * | 5/1934 | Laubenfels | ..................... | 111/7.3 |
| 2,251,587 A * | 8/1941 | Gagner | ............................ | 30/303 |
| 2,439,524 A * | 4/1948 | Moore | ........................... | 111/101 |
| 2,591,572 A * | 4/1952 | Mascaro | ........................... | 172/22 |
| 2,862,755 A * | 12/1958 | Gulden | ........................... | 294/61 |
| 3,149,873 A * | 9/1964 | Mockabee | ................... | 294/50.5 |
| 3,444,934 A * | 5/1969 | Alberto | ............................ | 172/25 |
| 4,715,634 A * | 12/1987 | Mueller et al. | ............... | 294/50.5 |
| D318,992 S * | 8/1991 | Anderson | .......................... | D8/6 |
| 5,080,027 A * | 1/1992 | Brothers | .......................... | 111/99 |
| D351,538 S * | 10/1994 | Gatewood | .......................... | D8/9 |
| 5,438,940 A * | 8/1995 | Bristow | ......................... | 111/115 |
| 6,959,768 B1 * | 11/2005 | Casillas | ........................ | 172/378 |
| D571,625 S * | 6/2008 | Donald et al. | .................... | D8/13 |
| 2006/0289178 A1 * | 12/2006 | Basek | ............................ | 172/371 |

* cited by examiner

*Primary Examiner* — Jamie L McGowan
(74) *Attorney, Agent, or Firm* — Ryan W. Dupuis; Kyle R. Satlerthwaile; Ade & Company, Inc.

(57) ABSTRACT

The invention is a method and apparatus for weed elimination using a manually operable weed stomping tool that is comprised of a handle, an elongated shaft, a footrest, and a weed stomping bit that has a cutting edge. When the weed stomping bit is positioned on the ground over the center of a weed and downward pressure is applied, either by pushing on the handle or stepping on the footrest, the weed stomping bit is forced into the ground while simultaneously the cutting edge of the weed stomping bit severs the weed's foliage from the stem and the weed stomping bit crushes the weed stalk and attendant root structure to a depth below grade.

4 Claims, 5 Drawing Sheets

WEED STOMPING TOOL

BACKGROUND OF THE INVENTION

1. Field of the Invention

The present invention relates to garden tools, more specifically, a method and apparatus for weed elimination utilizing a manually operable weed stomping tool that incorporates a weed stomping bit that has a bottom cutting edge designed to sever the weed's foliage from the stem while simultaneously the weed stomping bit crushes the weed stalk and attendant root structure to a depth below grade.

2. Background Information

There are many types of garden tools which can be utilized to remove weeds from the lawn and garden. Most of these tools rely upon some type of sharpened spikes, or root clamping blades, claws, or members designed to entrap a weed between these parts and afterward remove the weed and attendant root structure from the ground with upward force. Examples of the aforementioned garden tools can be seen in U.S. Pat. Nos. 5,234,241, 5,743,340, and Canadian patents 2507157, 2664002 as well as similar prior art. Other types of weed removing tools rely on extracting a core of soil containing the weed and attendant root structure, depositing the cores on the surface of the ground or into various receptacle types. Examples of the aforementioned other types of garden tools can be seen in U.S. Pat. No. 6,330,921 and Canadian patent number 2065940 and similar prior art. These types of prior art garden tools are not particularly efficient as multiple tasks are often needed to complete the extraction and debris clean up of a single weed. Often times these types of prior art garden tools leave undesirably large holes after weed extraction. These types of prior art garden tools rely upon one method or another to remove weeds or portions of weeds from the ground ultimately with upward force.

Accordingly, a method and apparatus for weed elimination using a weed stomping tool is disclosed having a handle, an elongated shaft, a footrest, and a weed stomping bit that has a downward facing bottom cutting edge. When the weed stomping bit is positioned on the ground over the centre of a weed and downward pressure is applied to the tool, either by pushing on the handle or stepping on the footrest, the weed stomping bit is forced into the ground while simultaneously the downward facing bottom cutting edge of the weed stomping bit severs the weed's foliage from the stem and the weed stomping bit crushes the weed stalk and attendant root structure to a depth below grade where they biodegrade. This method of eliminating weeds is novel because no removal of the weed takes place, but rather, foliage is severed from the weed, thereby cutting off the life-giving process of photosynthesis needed for the weed to survive, and the weed stalk and attendant root structure are crushed below grade where they biodegrade.

SUMMARY OF THE INVENTION

While the design of prior art garden tools are relatively effective at removing weeds, ultimately with upward force and further clean-up of the removed weeds and accompanying removed soil, elimination of weeds can be made faster and easier by having a weed stomping tool designed to eliminate a weed with one forceful step on the footrest or one forceful push on the handle whereby the downward force of the weed stomping bit crushes the weed to a depth below grade where it biodegrades and no further clean-up is required.

BRIEF DESCRIPTION OF THE DRAWINGS

A full understanding of the invention can be gained from the following detailed description of illustrative embodiments when read in conjunction with the accompanying drawings in which.

DRAWINGS

Figure 1:
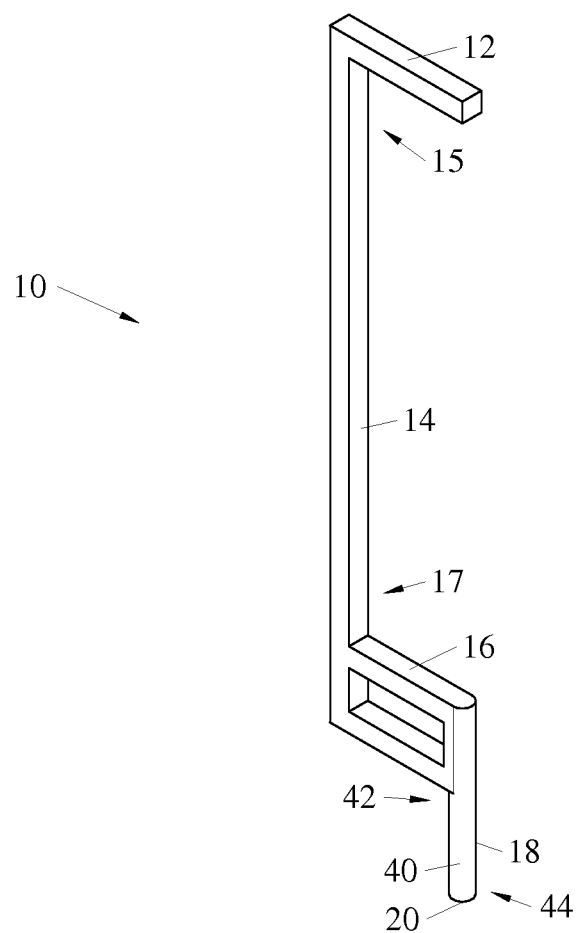
FIG. 1 is a perspective view of one embodiment of the weed stomping tool made as one entity.

Reference Numerals 10 weed stomping tool
12 handle
14 elongated shaft
15 elongated shaft upper end
16 footrest
17 elongated shaft lower end
18 weed stomping bit
20 downward facing bottom cutting edge
22 attaching element
24 weed stomping bit hole
26 footrest hole
28 handle grip
30 footrest plate
32 resilient element with a foliage arresting function
33 foliage arresting ring
34 inwardly bent end
36 mating hole
38 generally concave upwardly indented exterior bottom surface
40 exterior side surface
42 weed stomping bit upper end
44 weed stomping bit lower end

DESCRIPTION OF THE PREFERRED EMBODIMENTS

As shown in FIG. 1, a weed stomping tool 10 includes a handle 12 an elongated shaft 14 a footrest 16 and a weed stomping bit 18. The elongated shaft 14 has an elongated shaft upper end 15 and an elongated shaft lower end 17. The handle 12 is located substantially to on the elongated shaft upper end 15. The handle 12 in this embodiment radially extends from the elongated shaft 14. The footrest 16 is located substantially to on the elongated shaft lower end 17. The footrest 16 in this embodiment radially extends from the elongated shaft 14. The weed stomping bit 18 has a weed stomping bit upper end 42 and a weed stomping bit lower end 44. The weed stomping bit 18 is defined by one exterior side surface 40 and one generally concave upwardly indented exterior bottom surface. The weed stomping bit 18 has one downward facing bottom cutting edge 20. The downward facing bottom cutting edge 20 is further defined as a non-rounded or rounded intersection of the generally concave upwardly indented exterior bottom surface and the exterior side surface 40 of the weed stomping bit 18, the downward facing bottom cutting edge 20 thus formed at the perimeter of the generally concave upwardly indented exterior bottom surface where the generally concave upwardly indented exterior bottom surface intersects with the exterior side surface 40. The weed stomping bit 18 protrudes downwards from the footrest. In this embodiment the footrest 16 radially extends from the weed stomping bit 18. The weed stomping bit 18 and the elongated shaft 14 are parallel from each other and offset by the width of the footrest 16 in this embodiment. The weed stomping tool 10 in this embodiment is formed from one piece of material, such as metal, plastic, wood, etc. or other suitable material. When a user places the generally concave upwardly indented exterior bottom surface of the weed stomping bit 18 on the ground over the centre of a weed, and then applies generally downward pressure to the weed stomping tool 10 with one forceful step on the footrest 16 or one forceful push on the handle 12, the weed stomping bit 18 plunges into the ground, while simultaneously the downward facing bottom cutting edge 20 of the weed stomping bit 18 severs the weed's foliage from the stem. This foliage severing action thereby cuts off the life-giving process of photosynthesis needed for the weed to survive. Additionally, the weed stomping bit 18 crushes the weed stalk and attendant root structure to a depth below grade where they biodegrade.

Figure 2:
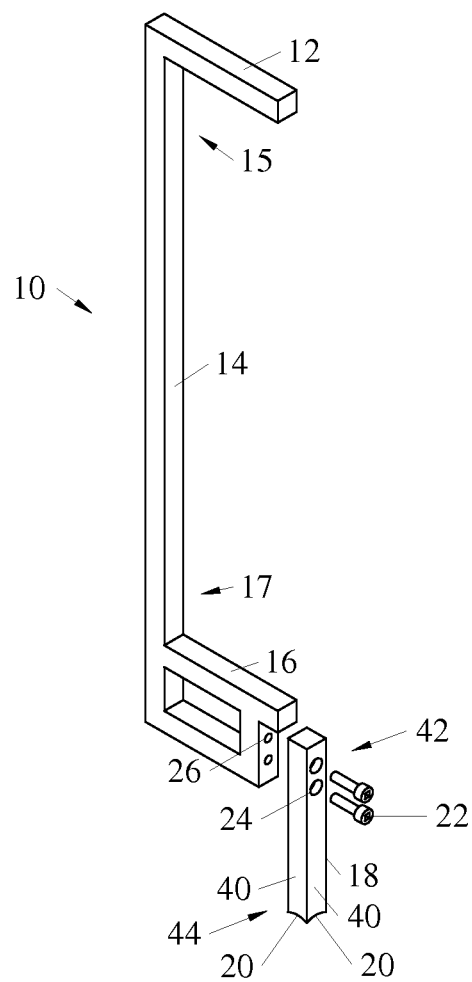
FIG. 2 is an exploded/perspective view of an alternate embodiment of the weed stomping tool comprised of more than one entity.

An alternate embodiment as shown in FIG. 2 is an exploded/perspective view of an alternate embodiment of the weed stomping tool 10 comprised of more than one entity, including a handle 12 an elongated shaft 14 a footrest 16 and a weed stomping bit 18. The elongated shaft 14 has an elongated shaft upper end 15 and an elongated shaft lower end 17. The handle 12 is located substantially on the elongated shaft upper end 15. The handle 12 in this embodiment radially extends from the elongated shaft 14. The footrest 16 is located substantially on the elongated shaft lower end 17. The footrest 16 in this embodiment radially extends from the elongated shaft 14. The weed stomping bit 18 and the elongated shaft 14 are parallel from each other and offset by the width of the footrest 16 in this embodiment. The weed stomping bit 18 has a weed stomping bit upper end 42 and a weed stomping bit lower end 44. The weed stomping bit 18 is defined by at least one exterior side surface 40 and at least one generally concave upwardly indented exterior bottom surface. The weed stomping bit 18 has at least one downward facing bottom cutting edge 20. At least one downward facing bottom cutting edge 20 is further defined as a non-rounded or rounded intersection of the at least one generally concave upwardly indented exterior bottom surface and the at least one exterior side surface 40. At least one downward facing bottom cutting edge 20 is thus formed at the perimeter of the at least one generally concave upwardly indented exterior bottom surface where the at least one generally concave upwardly indented exterior bottom surface intersects with the at least one exterior side surface 40. The weed stomping bit 18 has a hole 24 or plurality of holes drilled through the weed stomping bit upper end 42 to allow an attaching element 22 to pass through to connect the weed stomping bit 18 to the footrest 16. The footrest 16 has a hole 26 or plurality of holes to accept the attaching element 22 to attach the weed stomping bit 18 to the footrest 16. The weed stomping bit 18 protrudes downwards from the footrest 16. In this embodiment the footrest 16 radially extends from the weed stomping bit 18. The weed stomping tool 10 in this embodiment contemplates being formed from more than one part made from one or more types of material such as metal, plastic, wood, etc. In this embodiment the attaching element 22 is a bolt. Other suitable connection methods such as welding, gluing, element interlocking, or other appropriate methods for uniting various parts of the weed stomping tool 10 could be used to affix the various parts one to the other. These other suitable connection methods provide a means for joining to allow an attaching element 22 to connect the weed stomping bit 18 to the footrest 16. When a user places the at least one generally concave upwardly indented exterior bottom surface of the weed stomping bit 18 on the ground over the centre of a weed, and then applies generally downward pressure to the weed stomping tool 10 with one forceful step on the footrest 16 or one forceful push on the handle 12, the weed stomping bit 18 plunges into the ground, while simultaneously the at least one downward facing bottom cutting edge 20 of the weed stomping bit 18 severs the weed's foliage from the stem. This foliage severing action thereby cuts off the life-giving process of photosynthesis needed for the weed to survive. Additionally, the weed stomping bit 18 crushes the weed stalk and attendant root structure to a depth below grade where they biodegrade.

Figure 3:
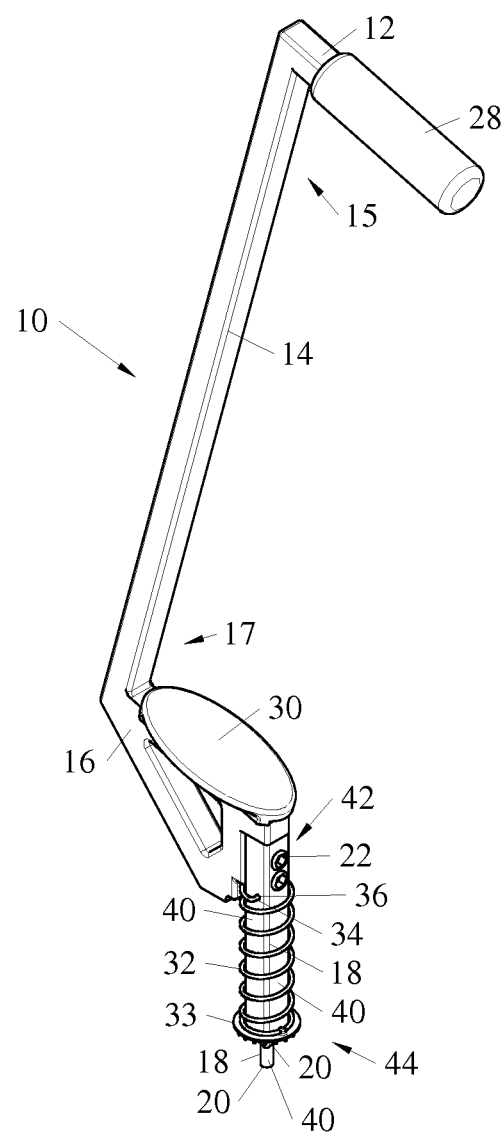
FIG. 3 is a perspective view of an alternate embodiment of the weed stomping tool, comprised of more than one part that includes a resilient member with a function which encircles the weed stomping bit.

In an alternate embodiment as shown in FIG. 3 is a perspective view of the weed stomping tool 10 comprised of more than one entity, including a handle 12 an elongated shaft 14 a footrest 16 more than one weed stomping bit 18 and a resilient element with a foliage arresting function 32 bearing a foliage arresting ring 33. The elongated shaft 14 has an elongated shaft upper end 15 and an elongated shaft lower end 17. The handle 12 is located substantially on the elongated shaft upper end 15. The handle 12 in this embodiment radially extends from the elongated shaft 14 and has a handle grip 28. The footrest 16 is located substantially on the elongated shaft lower end 17. The footrest 16 in this embodiment radially extends from the elongated shaft 14. The weed stomping bit 18 and the elongated shaft 14 do not have parallel orientation in this embodiment. The weed stomping bit 18 has a weed stomping bit upper end 42 and a weed stomping bit lower end 44. The weed stomping bit 18 is defined by at least one exterior side surface 40 and at least one generally concave upwardly indented exterior bottom surface. The weed stomping bit 18 has at least one downward facing bottom cutting edge 20. At least one downward facing bottom cutting edge 20 is further defined as a non-rounded or rounded intersection of the at least one generally concave upwardly indented exterior bottom surface and the at least one exterior side surface 40 of the weed stomping bit 18. The weed stomping bit 18 is encircled by the resilient element with a foliage arresting function 32 and the foliage arresting ring 33. The resilient element with a foliage arresting function 32 is a helical compression spring in this embodiment. The resilient element with a foliage arresting function 32 and the foliage arresting ring 33 have greater diameter than the widest cross-section of the largest weed stomping bit 18. This greater diameter allows the resilient element with a foliage arresting function 32 and the foliage arresting ring 33 to compress upward to a first compressed position without encumbrance when downward pressure is applied to the weed stomping tool 10. When no downward pressure is applied to the weed stomping tool 10, the resilient element with a foliage arresting function 32 returns without encumbrance to a second uncompressed position. The resilient element with a foliage arresting function 32 is slightly shorter in length than the weed stomping bit 18 of largest cross-section. The resilient element with a foliage arresting function 32 and the foliage arresting ring 33 serve to arrest the foliage of a weed when the user applies generally downward pressure to the weed stomping tool 10 by compressing the weed's foliage between the bottom, ground contacting surface of the foliage arresting ring 33 and the surface of the ground, thereby disallowing the foliage to follow the root stalk to a depth below grade when the weed stomping bit 18 plunges into the ground. In this embodiment the resilient element with a foliage arresting function 32 is connected to the weed stomping bit upper end 42 via a mating of an inwardly bent end 34 of the resilient element with a foliage arresting function 32 and a mating hole 36 in the weed stomping bit upper end 42. In this embodiment the attaching element 22 is a bolt. Other suitable connection methods such as welding, gluing, element interlocking, or other appropriate methods for uniting various parts of the weed stomping tool 10 could be used to affix the various parts one to the other. When a user places the at least one generally concave upwardly indented exterior bottom surface of the weed stomping bit 18 on the ground over the centre of a weed, and then applies generally downward pressure to the weed stomping tool 10 with one forceful step on the footrest 16 or one forceful push on the handle 12, the weed stomping bit 18 plunges into the ground. Simultaneously the resilient element with a foliage arresting function 32 and the foliage arresting ring 33 are caused to be compressed upwards without encumbrance as the weed stomping bit 18 plunges downward, thus arresting the foliage of the weed between the surface of the ground and the bottom surface of the foliage arresting ring 33. As the weed stomping bit 18 plunges into the ground the at least one downward facing bottom cutting edge 20 of the weed stomping bit 18 sever the weed's foliage from the stem. This foliage severing action thereby cuts off the life-giving process of photosynthesis needed for the weed to survive. Additionally, the weed stomping bit 18 crushes the weed stalk and attendant root structure to a depth below grade where they biodegrade.

Figure 4:
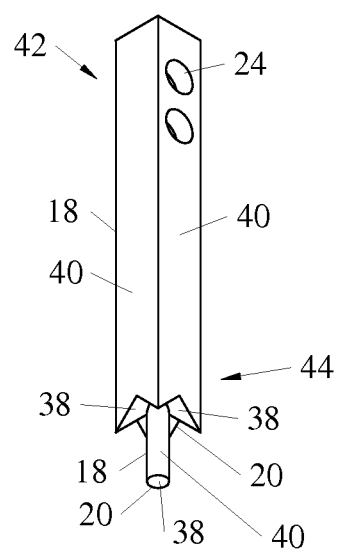
FIG. 4 is a perspective view from a bottom angle showing an embodiment of the weed stomping bit of generally square rod shape.

In FIG. 4 an embodiment is shown of the weed stomping bit 18 for use on a weed stomping tool, having an additional weed stomping bit 18 of smaller cross-section attached to and protruding downwards from the bottom of the larger weed stomping bit 18. The weed stomping bit 18 has a weed stomping bit upper end 42 and a weed stomping bit lower end 44. The weed stomping bit 18 of smaller cross-section assists a user in the placement of the weed stomping bit 18 over the center of a weed by more readily identifying the center of the weed. The weed stomping bit 18 or plurality of weed stomping bits have at least one exterior side surface 40. The weed stomping bit 18 or plurality of weed stomping bits have at least one upwardly indented exterior bottom surface 38, and at least one downward facing bottom cutting edge 20. At least one downward facing bottom cutting edge 20 is further defined as a non-rounded or rounded intersection of the at least one upwardly indented exterior bottom surface 38 and the at least one exterior side surface 40. At least one downward facing bottom cutting edge 20 thus formed at the perimeter of the at least one upwardly indented exterior bottom surface 38 where the at least one upwardly indented exterior bottom surface 38 intersects with the at least one exterior side surface 40. This embodiment shows two weed stomping bit holes 24 drilled through the weed stomping bit upper end 42 to allow an attaching element to attach the weed stomping bit 18 to the weed stomping tool. Suitable connection methods such as welding, gluing, element interlocking, or other appropriate methods for uniting the weed stomping bit 18 to a weed stomping tool could be used. These other suitable connection methods provide a means for allowing an attaching element to connect the weed stomping bit 18 to a weed stomping tool.

Figure 5:
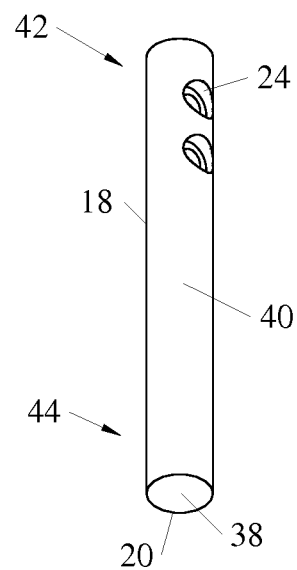
FIG. 5 is a bottom perspective view showing an alternate embodiment of the weed stomping bit of generally round rod shape.

In FIG. 5 an alternate embodiment is shown of a weed stomping bit 18 for use on a weed stomping tool, having a weed stomping bit upper end 42 and a weed stomping bit lower end 44. The weed stomping bit 18 in this embodiment has one exterior side surface 40, one generally concave upwardly indented exterior bottom surface 38, and one downward facing bottom cutting edge 20. The downward facing bottom cutting edge 20 is further defined as a non-rounded or rounded intersection of the one generally concave upwardly indented exterior bottom surface 38 and the one exterior side surface 40. One downward facing bottom cutting edge 20 thus formed at the perimeter of the one generally concave upwardly indented exterior bottom surface 38 where the one generally concave upwardly indented exterior bottom surface 38 intersects with the one exterior side surface 40. This embodiment shows two weed stomping bit holes 24 drilled through the weed stomping bit upper end 42 to allow an attaching element to attach the weed stomping bit 18 to the weed stomping tool.

As evidenced in the figures and in the description above, in each embodiment of the tool the bottom surface 38 faces downwardly so that the cutting edge 20 defined at the intersection of the bottom surface with the exterior side surface 40 extends continuously about a full perimeter of the bottom surface. Furthermore, the bottom surface 38 is upwardly indented or recessed at a central location so that the bottom surface extends upwardly and inwardly from the cutting edge at the perimeter towards the central location. While specific embodiments of the method and apparatus of the invention have been described in detail, it will be appreciated by those skilled in the art that various modifications and alternatives to those details could be developed in the light of the overall teachings of the disclosure. Accordingly, the particular arrangements disclosed are meant to be illustrative only and not limiting as to the scope of the invention which is to be given full breadth in the claims appended and any and all equivalents thereof.

What is claimed is:
1. A weed stomping tool comprising:
an elongated shaft extending between an upper end and a lower end,
a handle portion on the elongated shaft in proximity to the upper end,
a footrest portion on the elongated shaft in proximity to the lower end, and
a weed stomping bit arranged to be supported on the elongated shaft, the weed stomping bit having a concave bottom surface and an exterior side surface protruding downwardly beyond the footrest portion to the bottom surface which is downwardly facing and which defines a perimeter cutting edge at an intersection of the bottom surface and the exterior side surface, the bottom surface extending upwardly from the perimeter cutting edge towards an upwardly recessed portion of the bottom surface.

2. The weed stomping tool according to claim 1 wherein the perimeter cutting edge is continuous about a full perimeter of the bottom surface.

3. The weed stomping tool according to claim 1 wherein the upwardly recessed portion of the bottom surface is centrally located relative to the perimeter cutting edge.

4. A weed stomping tool comprising:
an elongated shaft extending between an upper end and a lower end,
a handle portion on the elongated shaft in proximity to the upper end,
a footrest portion on the elongated shaft in proximity to the lower end, and a weed stomping bit arranged to be supported on the elongated shaft,
  the weed stomping bit having a bottom surface and an exterior side surface protruding downwardly beyond the footrest portion to the bottom surface,
  the bottom surface of the weed stomping bit being downwardly facing,
  the bottom surface of the weed stomping bit defining a perimeter cutting edge about a full perimeter of the bottom surface at an intersection of the bottom surface and the exterior side surface, and
  the bottom surface of the weed stomping bit extending upwardly and inwardly from the perimeter cutting edge towards an upwardly recessed portion of the bottom surface which is centrally located relative to the perimeter cutting edge.

* * * * *